(12) United States Patent
Porter

(10) Patent No.: US 6,692,064 B1
(45) Date of Patent: Feb. 17, 2004

(54) REINFORCED BLOW-MOLDED BUMPERS

(75) Inventor: Marshall Ray Porter, Oakdale, IL (US)

(73) Assignee: Conix Corporation (CA)

(*) Notice: Subject to any disclaimer, the term of this patent is extended or adjusted under 35 U.S.C. 154(b) by 0 days.

(21) Appl. No.: 10/049,383

(22) PCT Filed: Aug. 9, 2000

(86) PCT No.: PCT/US00/21621

§ 371 (c)(1),
(2), (4) Date: Feb. 11, 2002

(87) PCT Pub. No.: WO01/12407

PCT Pub. Date: Feb. 22, 2001

Related U.S. Application Data

(60) Provisional application No. 60/148,889, filed on Aug. 13, 1999.

(51) Int. Cl.[7] ............................................... B60R 27/00
(52) U.S. Cl. ................. 296/187.01; 296/50; 296/146.1; 296/146.8; 293/102; 293/120; 264/510; 264/512
(58) Field of Search ................. 293/102, 110, 293/120, 122; 264/510, 512; 296/187.01, 50, 146.1, 146.8

(56) References Cited

U.S. PATENT DOCUMENTS

| | | |
|---|---|---|
| 5,012,614 A | 5/1991 | Shea |
| 5,014,816 A | 5/1991 | Dear et al. |
| 5,643,989 A | 7/1997 | Van de Grampel et al. |
| 5,649,587 A | 7/1997 | Plant |
| 5,712,003 A | 1/1998 | Suenaga |
| 5,736,081 A | 4/1998 | Yamakawa et al. |
| 5,780,129 A | 7/1998 | Ohta |
| 5,840,798 A | 11/1998 | Vollenberg et al. |
| 5,872,174 A | 2/1999 | Vaughn |

FOREIGN PATENT DOCUMENTS

JP 402088214 A * 3/1990 ............... 293/120

* cited by examiner

Primary Examiner—Joseph D. Pape
Assistant Examiner—Lori L. Coletta
(74) Attorney, Agent, or Firm—Banner & Witcoff, Ltd

(57) ABSTRACT

The present invention provides a blow-molded vehicle part and a blow-molding process for generating a one-piece vehicle part with improved strength, aesthetic appearance and reduced weight and cost. The blow-molded vehicle part includes a front vehicle part portion and a back vehicle part portion, wherein the front vehicle part and the back vehicle part have at least an outer unreinforced layer of a thermoplastic that forms a smooth outer surface of the vehicle part and a reinforced inner layer.

10 Claims, 2 Drawing Sheets

REINFORCED BLOW-MOLDED BUMPERS

This application is a 371 of PCT/US00/21621 Aug. 9, 2000 which claims the benefit of provisional application 60/148,889 filed Aug. 13, 1999.

BACKGROUND OF THE INVENTION

The present invention relates generally to processes for blow-molding and to articles made by blow-molding. More particularly, the present invention relates to multi-layer blow-molded bumper structures that incorporate reinforcing materials.

State-of-the-art automobile bumpers are typically manufactured by molding thermoplastics using a variety of molding techniques. These techniques strive to provide the best aesthetic qualities and structural strength, while reducing the material costs and weight of the finished product. Many techniques and bumper structures utilize reinforcing materials, such as glass fibers in order to increase the structural strength and reduce weight. While the use of such reinforcing materials is known to provide many desirable characteristics to molded articles, the use of such reinforcing materials in bumper structures produced by blow-molding techniques has heretofore been problematic. One reason for this is that the use of reinforcing materials in blow-molded bumper structures may produce irregularities or read-through in the outer surface finish of the bumper. Another reason is that the presence of many conventional reinforcing materials such as fiber reinforcement may render the bumper surface finish brittle and therefore unable to resist cracking when the bumper is subject to mild deformations.

In addition to the use of reinforcing materials, another known technique for increasing the strength of bumper structures involves the use of tacked-off bumper structures. In such structures, the internal surfaces of a bumper are made to contact and bond with each other to add structural strength. Typically, however, tacked-off structures result in a thermal sink and read-through to the finished surface. As such, tacked off structures have heretofore required the addition of a separately molded cover to provide an aesthetically pleasing exterior surface.

It would be desirable to provide blow-molded bumper structures which addresses the aforementioned shortcomings in the prior art. Specifically, it would be desirable to provide blow-molded bumper structures that utilize reinforcing materials, such as glass, mineral or carbon fibers or glass microspheres or nano-particles and which exhibit suitable surface finishes, even in bumper structures that incorporate tacked-off structures.

SUMMARY OF THE INVENTION

The aforementioned problems are eliminated and the desired advantages are realized by the present invention, which provides a blow-molded bumper structure that incorporates one or more internal layers that are reinforced with reinforcing materials, such as glass, mineral or carbon fibers or glass microspheres or nano-particles. The reinforced layer increases the strength of the bumper while reducing weight, density and material costs. The reinforced layer also provides a thermal barrier that acts to prevent read-through in tacked-off structures.

In one aspect, the invention may be defined as a blow-molded bumper including at least one inner layer containing a reinforcing material. More particularly, the invention may be defined as the aforementioned blow-molded bumper, wherein the reinforced layer is provided with glass fibers, mineral fibers, carbon fibers or glass microspheres or nano-particles.

In another aspect, the invention may be defined as a multi-layer blow-molded automobile bumper that includes at least one reinforced layer sandwiched between two unreinforced layers. More particularly, the invention may be defined as the aforementioned bumper, wherein the reinforced layer is provided with glass fibers, ceramic microspheres, mineral fibers, carbon fibers or glass microspheres or nano-particles.

BRIEF DESCRIPTION OF THE DRAWINGS

The accompanying drawings which are incorporated into and form a part of the specification, illustrate embodiments of the present invention and, together with the description, serve to explain the principles of the invention. The drawings are only for the purpose of illustrating preferred embodiments of the invention and are not to be construed as limiting.

DESCRIPTION OF THE PREFERRED EMBODIMENT

Figure 1:
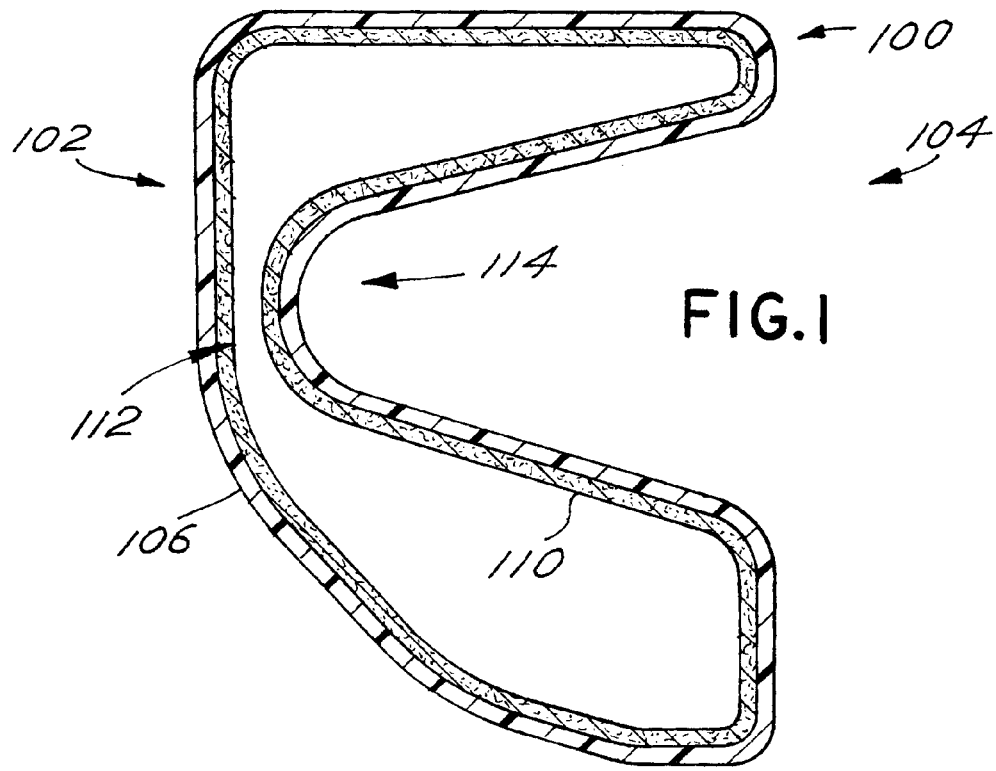
FIG. 1 is a cross-sectional view of a two-layered blow-molded automobile bumper including an inner reinforced layer.

FIG. 1 is a cross-sectional view of a blow-molded automobile bumper 100 according to a preferred embodiment of the present invention. Bumper 100 includes a front portion 102 and back portion 104. An outer layer 106 is provided as an unreinforced layer of thermoplastic which has desirable aesthetic qualities so as to form a smooth outer surface. Outer layer 106 completely surrounds an inner layer 110, which is provided as a reinforced thermoplastic. According to the invention, glass, mineral, carbon fibers, glass microspheres, ceramic microspheres or nano-particles may be used separately or in combination to provide the reinforcement to the reinforced inner layer 110. The glass may be in the form of glass fibers or glass microspheres. The mineral is typically in the form of mineral fibers. The bumper 100 shown in FIG. 1 includes a gap space 112 between the front portion 102 and a recessed portion 114, which is formed during the molding process. Clearly the method of the present invention may be used to manufacture, for example, a bumper, a tail-gate, a door, or a running board.

As will be recognized by those of ordinary skill in the art, the bumper 100 depicted in FIG. 1, may be manufactured by utilizing a multilayered extrusion blow molding process. The first step is the extrusion of the multilayered thermoplastic parison to a length suitable for the size of the mold, wherein at least one inner layer includes at least one of: glass, mineral, carbon fibers, glass microspheres, ceramic microspheres or nano-particles. The parison is formed by heating thermoplastic material to a temperature where it is very soft but still able to retain its shape. Second, the mold is closed around the parison. High pressure gas is injected into the parison expanding it against the inside of the mold. Contact with the mold cools the material until hard. Finally the mold is opened and the molded part is removed using appropriate equipment. This process is the same regardless of how many layers are in the parison.

Figure 2:
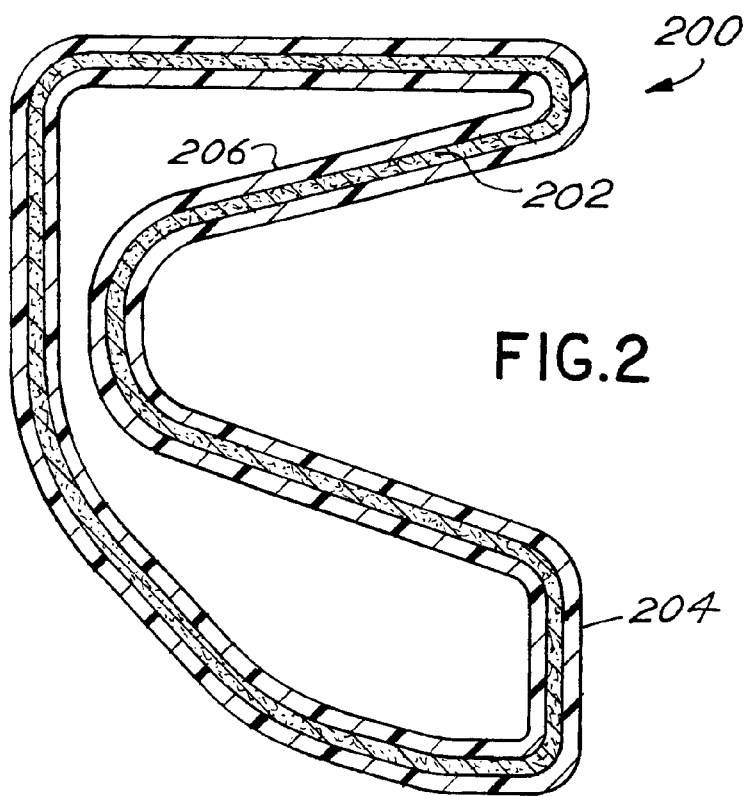
FIG. 2 is a cross-sectional view of a three-layer blow-molded automobile bumper.

FIG. 2 illustrates a three-layer bumper 200 according to the invention. The bumper structure 200 includes a reinforced barrier layer 202 that is sandwiched between an outer layer 204 and an inner layer 206. As in the example of FIG. 1, reinforced barrier layer 202 may include glass, mineral, carbon fibers, glass microspheres, ceramic microspheres or nano-particles, for examples. This particular structure, with the reinforced barrier layer 202 sandwiched between two layers of unreinforced material is useful to prevent the separation of layers upon deformation of the bumper structure.

Figure 3:
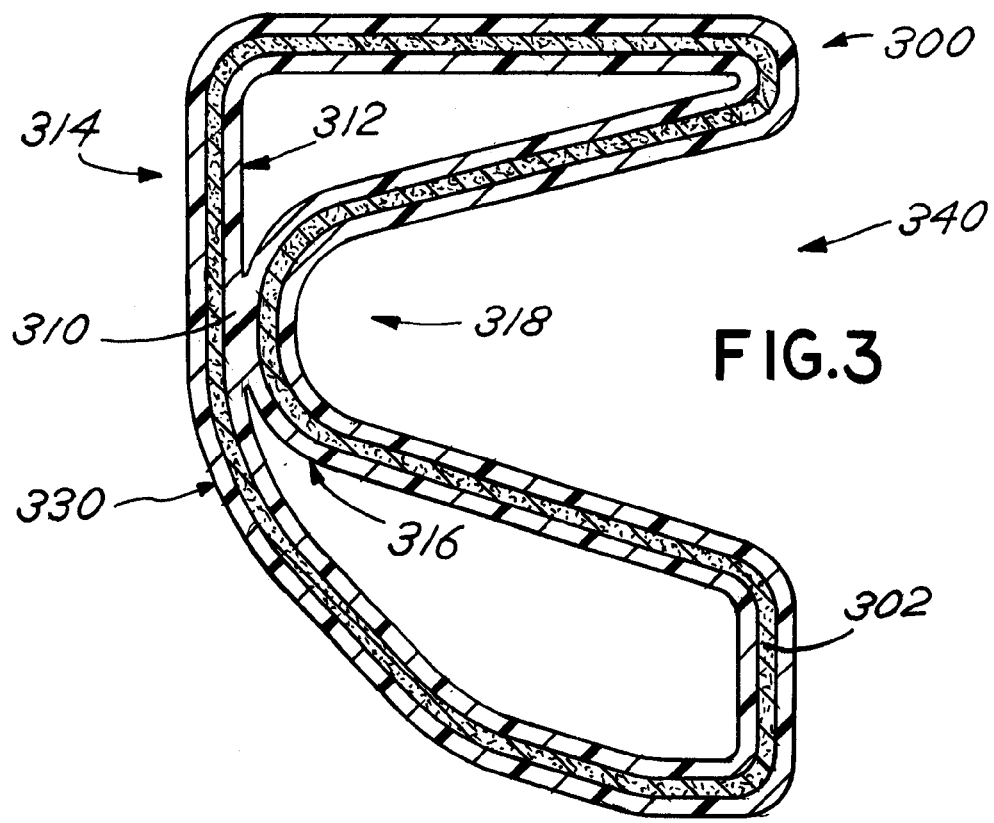
FIG. 3 is a cross-sectional view of a three-layer blow-molded automobile bumper.

FIG. 3 illustrates another three-layer bumper structure 300 according to the invention. The bumper structure is like that shown in FIG. 2, except that it includes a tacked-off portion 310 where an internal surface 312 of the front portion 314 and an internal surface 316 of the recessed portion 318 are caused to bond together. Tack-off 310 between the front portion 314 and back portion 340 can be controlled by designing the distance in the specified area to be less than the thickness of the parison layers that line the mold.

As will be appreciated by those of ordinary skill in the art, the thermal insulating characteristics of the reinforced barrier layer 302, owing to the presence of glass, mineral, carbon fibers, glass micropheres, ceramic microspheres or nano-particles, acts to prevent read-through of the tacked-off portion to the outer surface 330 of the front portion 314. Thus, the blow-molded bumper 300 may be formed in a single step without the addition of an outer surface layer to conceal read-through. Moreover, the tacked-off portion provides increased structural strength to the bumper 300.

The fiber-reinforced layer of the invention provides for reduced material cost, since the fibers therein act as a relatively inexpensive filler material to the relatively expensive thermoplastic materials. Thus, the fiber reinforced layer creates cost savings due to the displacement of comparatively heavy and costly resin materials with comparatively inexpensive reinforcing materials or nano-particles. The result is a blow-molded, one-piece automobile bumper, with improved strength, aesthetic appearance and reduced weight and cost compared to previous bumpers.

Figure 4:
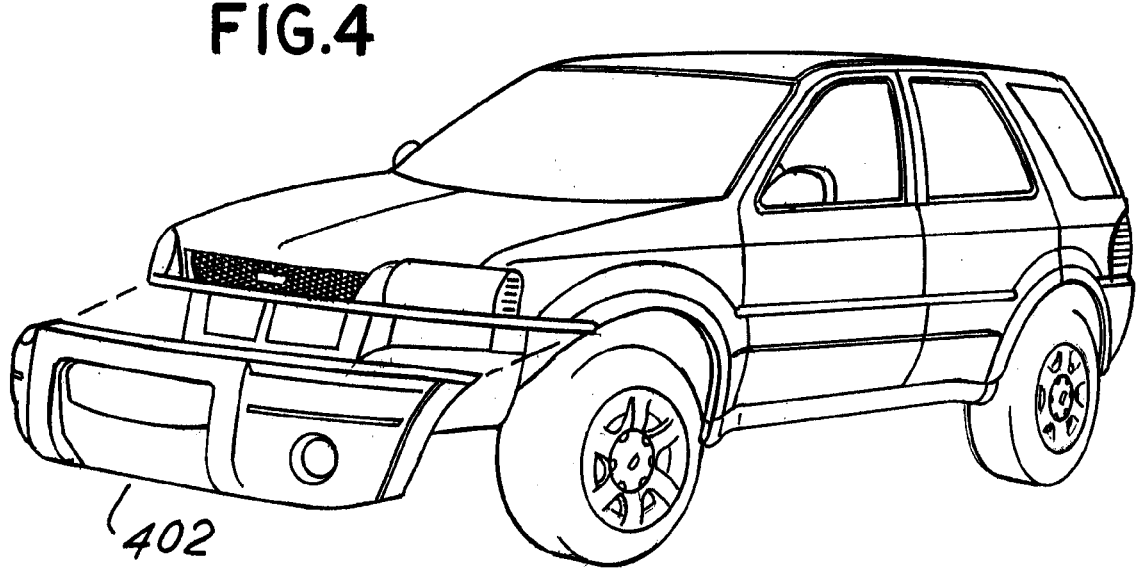
FIG. 4 is a cross-sectional view of a vehicle bumper manufactured in accordance with the present invention.

FIG. 4 is a cross-sectional view of a vehicle bumper 402 manufactured in accordance with the present invention.

Although the preferred embodiments of the invention have been described hereinabove in some detail, it should be appreciated that a variety of embodiments will be readily available to persons utilizing the invention for a specific end use. The description of this invention is not intended to be limiting on this invention, but is merely illustrative of the preferred embodiment of this invention. Other products and methods that incorporate modifications or changes to that which has been described herein are equally included within this application. Additional objects, features and advantages of the present invention will become apparent by referring to the above description of the invention in connection with the accompanying drawings.

What is claimed is:

1. A blow-molded vehicle part comprising:
   a front vehicle part portion, and
   a back vehicle part portion,
   the front vehicle part and the back vehicle part having an outer unreinforced layer of a thermoplastic that forms a smooth outer surface of the vehicle part and a reinforced inner layer lying against the outer unreinforced layer
   the reinforced inner layer including at least one of: glass, mineral, carbon fibers, glass microspheres, ceramic microspheres and nano-particles,
   the back vehicle part portion including a recessed portion that is recessed toward the front vehicle part portion to form a gap space between the front vehicle part portion and the recessed portion, wherein the recessed portion with the gap space is formed during a molding process,
   the front vehicle part portion and the back vehicle part portion further including another layer of unreinforced thermoplastic that sandwiches the reinforced inner layer between the outer unreinforced layer and said other layer of unreinforced thermoplastic.

2. The blow-molded vehicle part of claim 1 wherein:
   the back vehicle part portion is recessed toward the front vehicle part portion to form a distance between the front vehicle part portion and the recessed portion that is less than a thickness of parison layers that line the mold, bonding said other layer of unreinforced thermoplastic of the back vehicle part portion with said layer of unreinforced thermoplastic of the front vehicle part portion during a molding process.

3. The blow-molded vehicle part of claim 1 wherein the vehicle is an automobile.

4. The blow-molded vehicle part of claim 1 wherein the part is one of: a bumper, a tail-gate, a door, and a running board.

5. A blow-molding process for manufacturing a multilayered portion vehicle part comprising the steps of:
   extruding a multilayered thermoplastic parison to a length suitable for a size of a preselected mold, wherein at least one reinforced inner layer includes at least one of: glass, mineral, carbon fibers, glass microspheres, ceramic microspheres and nano-particles and wherein the reinforced inner layer is sandwiched between an outer unreinforced layer and an inner unreinforced layer;
   closing the preselected mold around the parison;
   heating the parison to a temperature at which the parison is very soft but still able to retain a desired shape;
   injecting a high pressure gas into the parison to expand the parison against an inside of the preselected mold; and
   allowing the parison to-cool and, when the thermoplastic material has cooled sufficiently, removing the part from the preselected mold.

6. The blow-molding process of claim 5 further including, before removing the part from the preselected mold, repeating the above steps at least one time using an unreinforced thermoplastic material until a desired number of layers are formed.

7. The blow-molding process of claim 5 wherein the vehicle is an automobile.

8. The blow-molding process of claim 5 wherein the part is one of: a bumper, a tail-gate, a door, and a running board.

9. The blow-molding process of claim 5 further including, before removing the part from the preselected mold, repeating the above steps at least one time using a reinforced thermoplastic material until a desired number of layers are formed.

10. The blow-molding process of claim 5, the step of injecting a high pressure gas into the parison to expand the parison against an inside surface of the preselected mold a back vehicle part portion is recessed toward a front vehicle part portion to form a distance between the front vehicle part portion and the recessed portion that is less than a thickness of parison layers that line the mold, and the further step of bonding an innermost layer of the back vehicle part portion with an innermost layer of the front vehicle part portion.

* * * * *